(12) United States Patent
Ikeda

(10) Patent No.: US 8,064,705 B2
(45) Date of Patent: Nov. 22, 2011

(54) IMAGE PROCESSING APPARATUS AND CONTROL METHOD THEREOF

(75) Inventor: Kazuyo Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 803 days.

(21) Appl. No.: 12/060,838

(22) Filed: Apr. 1, 2008

(65) Prior Publication Data

US 2008/0253661 A1    Oct. 16, 2008

(30) Foreign Application Priority Data

Apr. 12, 2007 (JP) ................. 2007-105250

(51) Int. Cl.
*G06K 9/48* (2006.01)

(52) U.S. Cl. ..................................... 382/199

(58) Field of Classification Search .................. None
See application file for complete search history.

(56) References Cited

FOREIGN PATENT DOCUMENTS

| | | |
|---|---|---|
| CN | 1720550 A | 1/2006 |
| WO | 2004/051573 A2 | 6/2004 |

OTHER PUBLICATIONS

Chee Sun Won et al., "Efficient Use of MPEG-7 Edge Histogram Descriptor", ETRI Journal, vol. 24, No. 1, Feb. 2002.
Office Action dated Mar. 11, 2010 in counterpart Chinese Application No. 200810089949.8.

*Primary Examiner* — Daniel Mariam
*Assistant Examiner* — Elisa Rice
(74) *Attorney, Agent, or Firm* — Fitzpatrick, Cella, Harper & Scinto

(57) ABSTRACT

An image processing apparatus divides an image into a plurality of first image blocks, each of which is a partial area of the image, and further divides each first image block to acquire a plurality of compartments that correspond to filters for determining an edge direction of an image of the first image block. The image processing apparatus determines the edge direction of each first image block based on the plurality of compartments and the filters, and decides that a first image block whose edge direction cannot be determined is a failed image block. The image processing apparatus then generates, from the failed image block, a second image block constituted by a plurality of compartments that differ in size from the plurality of acquired compartments, and determines the edge direction of the second storage block based on the plurality of newly generated compartments and the filters.

11 Claims, 15 Drawing Sheets

FIG. 4

| IMAGE ID (401) | EDGE HISTOGRAM (402) | IMAGE FILE PATH (403) |
|---|---|---|
| 1 | Eij | c : ¥ picture ¥ dog.bmp |
| 2 | Eij | c : ¥ picture ¥ cat.bmp |
| : | : | : |

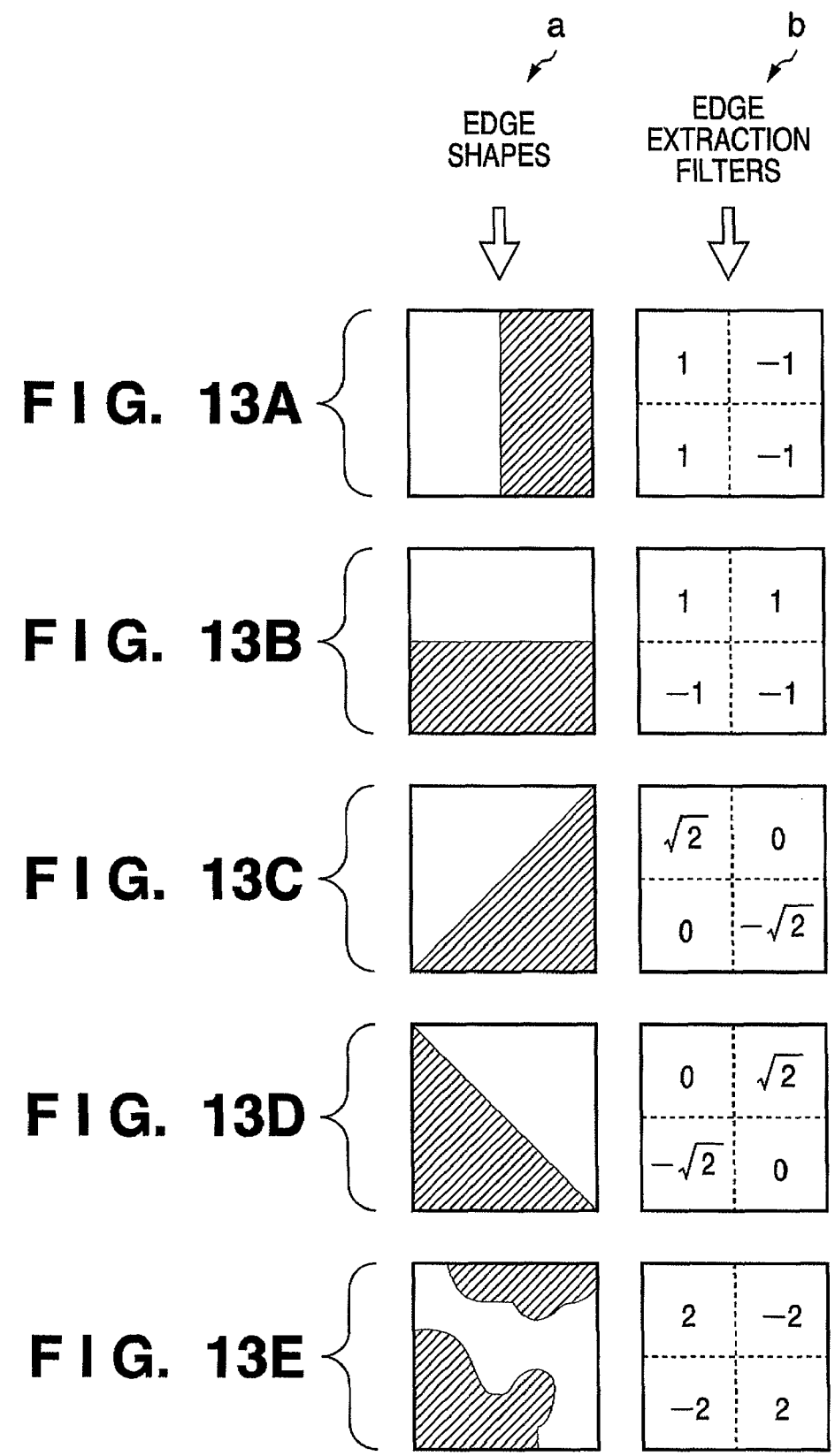

IMAGE PROCESSING APPARATUS AND CONTROL METHOD THEREOF

BACKGROUND OF THE INVENTION

1. Field of the Invention

The present invention relates to an image processing apparatus that extracts an edge feature from an image and a control method thereof.

2. Description of the Related Art

Heretofore, various image retrieval methods and recognition methods using edge features have been proposed. A typical edge extraction method involves performing a calculation per pixel using differential filters on a range that includes neighboring pixels. Filters used include a Prewitt filter, Sobel filter, Robison filter, and Kirsch filter. In the case where edge features are used in image retrieval or the like, the edge distribution in a partial area of the image is used as a feature amount in many cases.

The edge histogram disclosed in "Efficient Use of MPEG-7 Edge Histogram Descriptor" (Chee Sun Won et al., ETRI Journal, Vol. 24, No. 1, February 2002; hereinafter, document 1) uses an edge extraction method required to obtain edge distributions at a lower calculation cost compared to a method using the Sobel filter or the like. The edge extraction method disclosed in document 1 will now be described.

Firstly, an input image 10 is divided into 4×4 sub-images 11, such as shown in FIG. 12. The respective sub-images are further divided into square image blocks 12 so as to approximate a prescribed number. Next, the image blocks are further divided into four (2×2) compartments 13, and average luminances a(0) to a(3) are determined for the respective compartments. Next, the respective edge strengths m_v, m_h, m_d45, m_d135 and m_nd are calculated, using filters corresponding to the four directions shown in FIGS. 13A to 13D, that is, (a) vertical, (b) horizontal, (c) 45 degree and (d) 135 degree, and the non-direction shown in FIG. 13E. For example, m_v will be represented by the following expression when a(n) expresses the average luminance of each of the four compartments into which the image blocks 12 are divided (note that n=0 to 3, and shows the number attached to each of the four compartments).

$$m\_v = |1 \times a(0) + (-1) \times a(1) + 1 \times a(2) + (-1) \times a(3)| \quad (1)$$

When the maximum value among the edge strengths m_v, m_h, m_d45, m_d135 and m_nd is greater than or equal to a prescribed threshold A, the direction of the maximum value is determined to be the direction of the edge of the target image block. The threshold A is the minimum strength value at which an edge is considered to exist. An edge histogram Eij is calculated by counting the directions of each image block 12 included in a sub-image 11. Note that i=0 to 4 corresponds to the filters shown in FIGS. 13A to 13E, and j=0 to 15 corresponds to the sub-images 11. The edge histogram Eij thus obtained is used as the feature amount.

However, the edge extraction method shown in document 1 is not always able to satisfactorily obtain edge features despite the advantage of having a small calculation cost compared to edge extraction methods that use the Sobel filter or the like. The case in which this edge extraction method is applied to image retrieval that targets the lines of a binary image will be described as an example in which this problem is markedly evident.

In FIG. 14A, four equidistant lines 21 overlap a total of 16 areas respectively obtained by dividing four image blocks of width 2d in four. With the lines of binary images, hatching composed on equidistantly spaced straight lines is often used in order to represent areas of particular density, such as with the areas corresponding to the lines 21. It is not always possible to extract hatching, depending on the relation between the size of the image blocks 12 and the spacing of the lines 21, with respect to such hatched areas. For example, consider the case where the size of the image blocks 12 and the spacing of the lines 21 are synchronized, as shown in FIG. 14A. Assume that the size (width and height) of the image blocks 12 is 2d, the thickness (width) of the lines 21 is b, and the spacing between the lines 21 is g. When these values are in the relation shown in the following equation (2), for example, the a(n) values in equation (1) will all be the same. Thus, the m_v value will be 0, making it impossible to detect the vertical lines, despite the vertical lines clearly existing.

$$d = b + g \quad (2)$$

In the case where image retrieval using edge histograms is performed, an image can be retrieved if the edge histogram of an image provided by a query is similar to the edge histogram of an image stored in a database. Consequently, the feature amounts of the edge histograms in the database and the query will be similar if it is always impossible to detect an edge even when the lines 21 exists such as in FIG. 14A. However, in the case where the size of the image blocks 12 and the spacing of the lines 21 are slightly out of sync, as in FIG. 14B, it may or may not be possible to detect an edge, depending on the extent of the deviation. For example, consider the case where the image blocks 12 and the hatched lines 21 are disposed in a relation such as FIG. 14B. The values in equation (1) will be as follows when the size (width and height) of the image blocks 12 is 2d, the deviation of the left edge of the line 21 from the left edge of the image block 12 is a, the thickness of the lines 21 is b, the spacing between the lines 21 is g, the luminance of the lines 21 is 0, and the luminance of the white background is 255.

$$a(0) = a(2) = (d - (b-a) \times 255)/d$$

$$a(1) = a(3) = ((d-b) \times 255)/d$$

$$m\_v = (a \times 255)/d \quad (3)$$

Consequently, assuming the size of the image blocks is the same for the image in the query and the image in the database, the value of m_v will be larger or smaller than the threshold A depending on the value of a, either enabling or preventing an edge from being detected.

This state expands in the direction of the hatched lines 21 as the lines 21 increase in length, and also expands perpendicular to the lines 21 depending on conditions such as the thickness and spacing of the lines 21. Hatching is also sometimes applied to wide areas, which leads to the feature amounts of the edge histograms differing greatly even with images that look extremely similar, and results in not being able to retrieve similar images.

SUMMARY OF THE INVENTION

The present invention has been made in consideration of the above problems. According to an embodiment of the present invention, an image processing apparatus and method capable of more accurately calculating the edge feature amount of an image are provided.

According to one aspect of the present invention, there is provided an image processing apparatus comprising:

a dividing unit configured to divide an image into a plurality of first image blocks, each of which is a partial area of the image;

an acquiring unit configured to divide each first image block obtained by the dividing means, and acquire a plurality of compartments that correspond to filters for determining an edge direction of an image of the first image block;

a first determining unit configured to determine the edge direction of each first image block, based on the plurality of compartments acquired by the acquiring unit and the filters;

a deciding unit configured to decide that a first image block whose edge direction cannot be determined by the first determining unit is a failed image block;

a generating unit configured to generate, from the failed image block, a second image block constituted by a plurality of compartments that differ in size from the plurality of compartments acquired by the acquiring unit; and a second determining unit configured to determine the edge direction of the second storage block, based on the plurality of compartments generated by the generating unit and the filters.

Also, according to another aspect of the present invention, there is provided an image processing method comprising:

a dividing step of dividing an image into a plurality of first image blocks, each of which is a partial area of the image;

an acquiring step of dividing each first image block obtained in the dividing step, and acquiring a plurality of compartments that correspond to filters for determining an edge direction of an image of the first image block;

a first determining step of determining the edge direction of each first image block, based on the plurality of compartments acquired in the acquiring step and the filters;

a deciding step of deciding that a first image block whose edge direction cannot be determined in the first determining step is a failed image block;

a generating step of generating, from the failed image block, a second image block constituted by a plurality of compartments that differ in size from the plurality of compartments acquired in the acquiring step; and a second determining step of determining the edge direction of the second storage block, based on the plurality of compartments generated in the generating step and the filters.

Also, according to yet another aspect of the present invention, there is provided an image processing method comprising:

a computer-readable storage medium storing a computer program that causes a computer to execute:

a dividing step of dividing an image into a plurality of first image blocks, each of which is a partial area of the image;

an acquiring step of dividing each first image block obtained in the dividing step, and acquiring a plurality of compartments that correspond to filters for determining an edge direction of an image of the first image block;

a first determining step of determining the edge direction of each first image block, based on the plurality of compartments acquired in the acquiring step and the filters;

a deciding step of deciding that a first image block whose edge direction cannot be determined in the first determining step is a failed image block;

a generating step of generating, from the failed image block, a second image block constituted by a plurality of compartments that differ in size from the plurality of compartments acquired in the acquiring step; and a second determining step of determining the edge direction of the second image block, based on the plurality of compartments generated in the generating step and the filters.

Further features of the present invention will become apparent from the following description of exemplary embodiments with reference to the attached drawings.

BRIEF DESCRIPTION OF THE DRAWINGS

FIG. 4 shows an exemplary data configuration of an index using edge histograms in the preferred embodiment.

FIGS. 13A to 13E show exemplary edge shapes and extraction filters.

DESCRIPTION OF THE EMBODIMENTS

A preferred embodiment of the present invention will now be described in detail in accordance with the accompanying drawings. In the following embodiment, an example is described whereby a method of extracting edges in an image is applied to image retrieval in which edge histograms are used as feature amounts.

Figure 1:
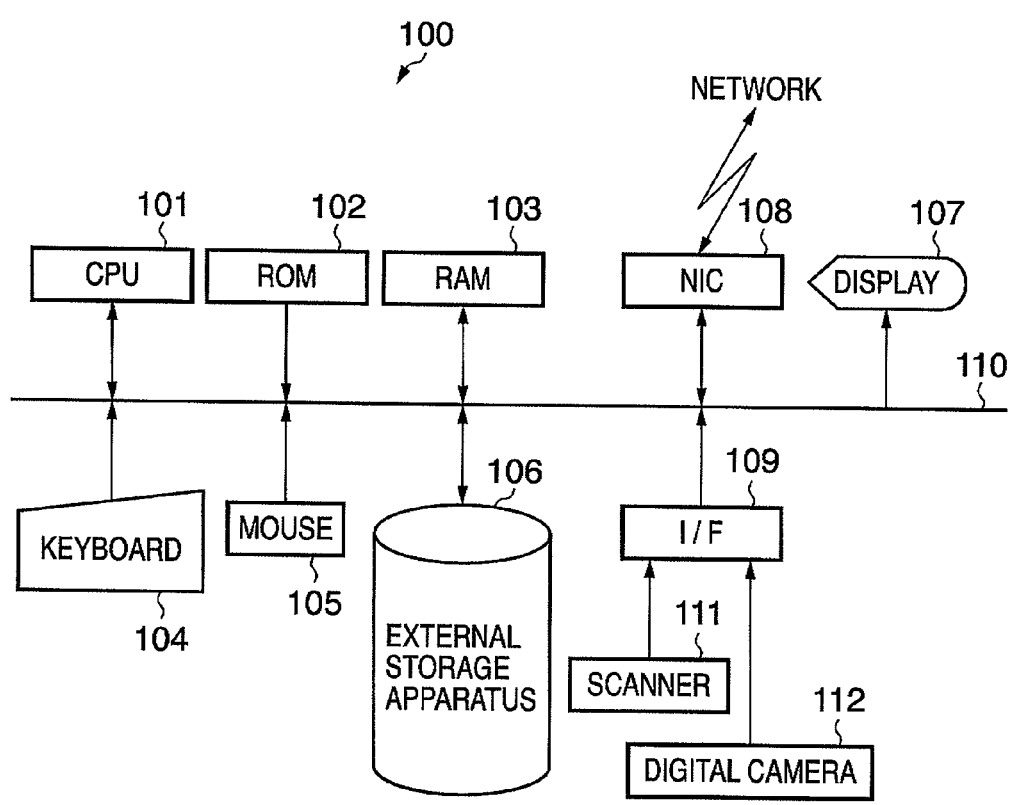
FIG. 1 is a block diagram showing an exemplary configuration of an image processing apparatus according to a preferred embodiment.

FIG. 1 is a block diagram showing a control configuration of an image processing apparatus 100 in the present embodiment. In FIG. 1, reference numeral 101 is a CPU which executes various controls in the image processing apparatus 100 of the present embodiment. Reference numeral 102 is a ROM which stores various data and a boot program executed when starting up the apparatus. Reference numeral 103 is a RAM which stores computer programs for processing performed by the CPU 101, and provides a work area for when the CPU 101 executes various controls. Reference numeral 104 is a keyboard and 105 is a mouse as a pointing device, which together provide an environment for various input operations by the user.

Reference numeral 106 is an external storage apparatus which is constituted by a hard disk, a floppy (registered trademark) disk, an optical disk, a magnetic disk, a magneto-optical disk, a magnetic tape, a nonvolatile memory card, or the like. Reference numeral 107 is a display which is constituted by a liquid crystal display or the like, and displays results and the like to the user. Reference numeral 108 is a network interface which enables communication with devices over a network. Reference numeral 109 is an IEEE 1394, USB or similar interface for communicating with devices such as a scanner 111 or a digital camera 112. Reference numeral 110 is a system bus which communicably connects the foregoing constituent elements.

Note that the external storage apparatus 106, the scanner 111 and the digital camera 112 may be substituted for devices disposed on a network.

Figure 2:
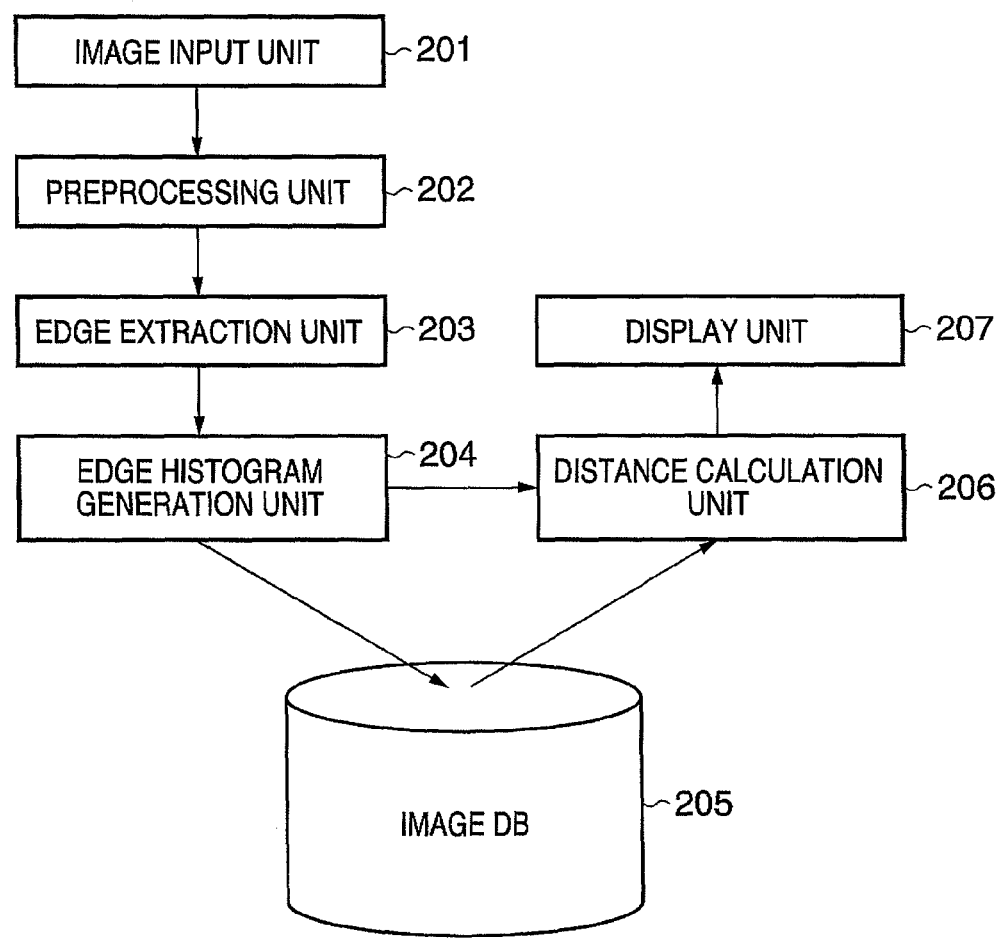
FIG. 2 is a block diagram showing an exemplary functional configuration of the image processing apparatus according to the preferred embodiment.

FIG. 2 is a block diagram showing an exemplary functional configuration related to edge extraction and feature amount calculation performed by the image processing apparatus 100 of the present embodiment.

In FIG. 2, reference numeral 201 is an image input unit which inputs an image acquired by a device such as the scanner 111 or the digital camera 112, via the interface 109, or an image existing on the Internet or a LAN, via the network interface 108. Reference numeral 202 is a preprocessing unit which performs required preprocessing on the input image. Reference numeral 203 is an edge extraction unit which performs an edge extraction process on the image preprocessed by the preprocessing unit 202. Reference numeral 204 is an edge histogram generation unit that generates an edge histogram showing the occurrence frequency of an edge direction based on the result of edge extraction by the edge extraction unit 203. Reference numeral 205 is an image database which stores and manages input images in association with edge histograms. Reference numeral 206 is a distance calculation unit that calculates the distance between images. The distance calculation unit 206 calculates the distance between the edge histogram of an input query image and the edge histogram of each image in the image database 205 when retrieval is performed. Reference numeral 207 is a display unit which displays retrieved images to the user, based on the result of the distance calculation by the distance calculation unit 206. The foregoing units are realized by the CPU 101 executing a computer program stored in the ROM 102 or a computer program loaded from the external storage apparatus 106 to the RAM 103.

Registration

Figure 3:
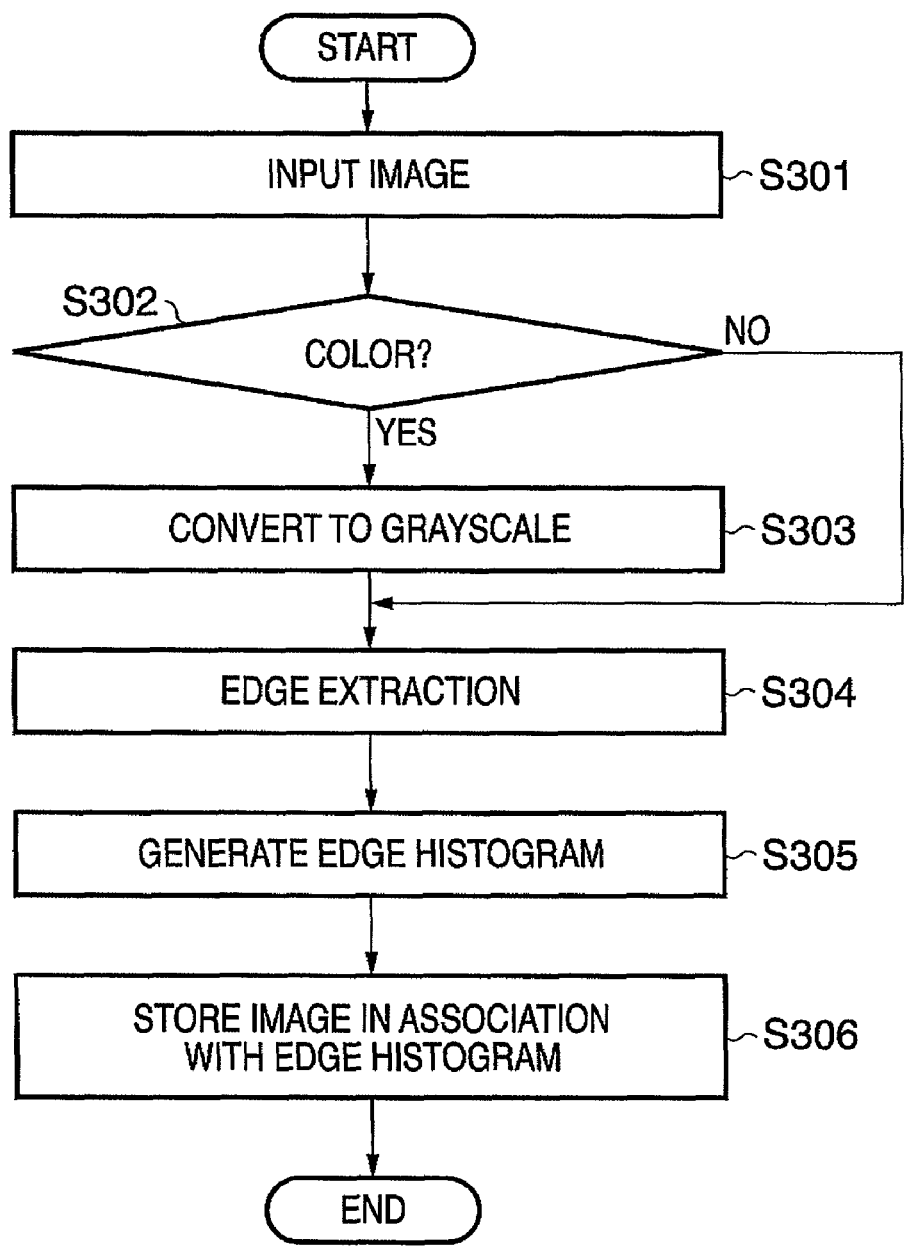
FIG. 3 is a flowchart showing a registration process according to the preferred embodiment.

Firstly, registration of images to the image processing apparatus 100 will be described using the flowchart of FIG. 3.

Firstly, in step S301, the image input unit 201 inputs an image to register via the network interface 108 or the interface 109. Next, in step S302, the preprocessing unit 202 determines whether the input image is color or grayscale. If the input image is color, the preprocessing unit 202, in step S303, converts the input image to grayscale. Note that in the case where the image is acquired from the digital camera 112, the determination of whether the image is color or grayscale can be performed by analyzing the data format of the image and referring to the header information. If the image is acquired from the scanner 111, this determination can be performed based on scanner conditions set by the user. Also, the conversion from color to grayscale in step S303 can be performed by converting the values of the red (R), green (G) and blue (B) pixels in the color image data to a grayscale signal (Y) using the following equation (4), for example.

$$Y = 0.299 \times R + 0.587 \times G + 0.114 \times B \quad (4)$$

Next, in step S304, the edge extraction unit 203 performs edge extraction on the input image. The process of edge extraction will be described in detail below. Next, in step S305, the edge histogram generation unit 204 aggregates the edges extracted at step S304, and generates an edge histogram Eij such as described above using FIG. 12 and FIGS. 13A to 13E. Next, in step S306, the edge histogram generation unit 204 stores the generated edge histogram Eij as an index in association with the image in the image database 205.

FIG. 4 is an exemplary index using edge histograms. An image ID 401 is an identifier (ID) assigned to a registered image. An edge histogram 402 is an edge histogram Eij of a corresponding image. An image file path 403 is path information to a registered image file. The body of image data can be read out by referring to this path information.

Edge Extraction Process

Figure 5:
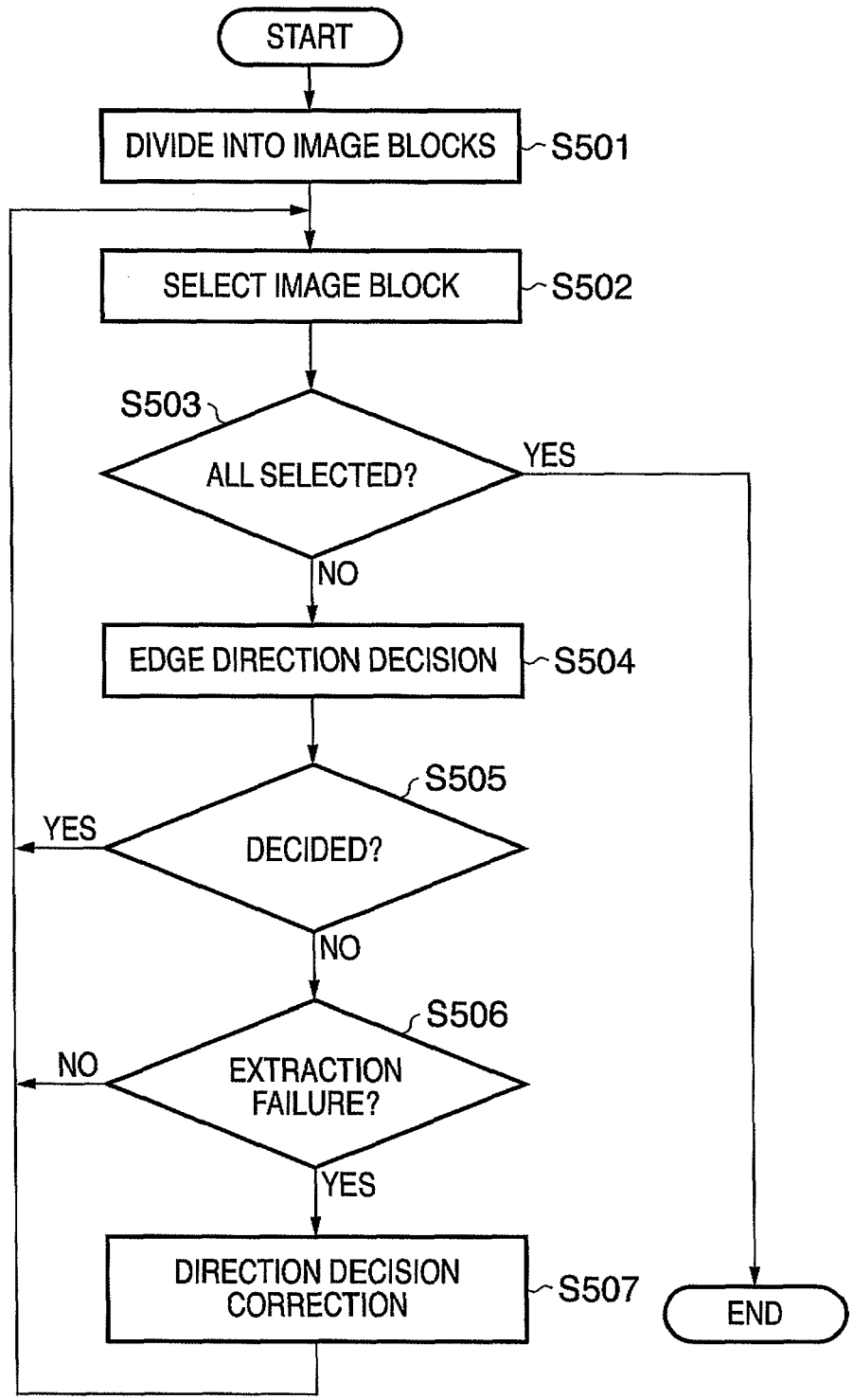
FIG. 5 is a flowchart showing an edge extraction process according to the preferred embodiment.

The edge extraction process will be described in detail using the flowchart of FIG. 5.

Figure 12:
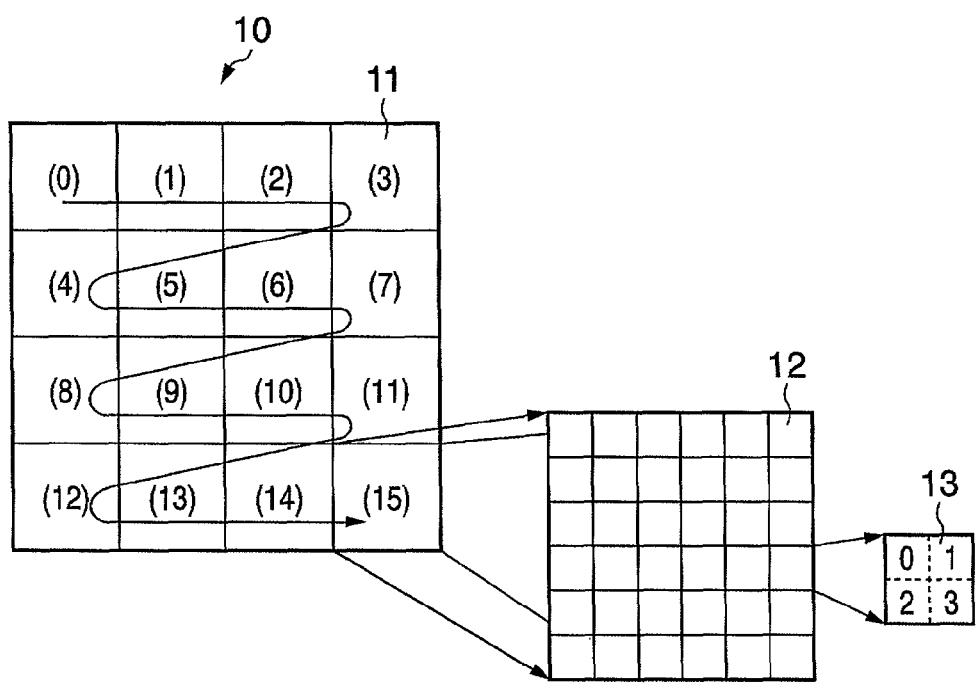
FIG. 12 shows the relation between sub-images, image blocks and compartments in an image.

Firstly, in step S501, the edge extraction unit 203 divides the input image into image blocks. This involves dividing the input image so as to secure square image blocks 12 approximating a prescribed number in each of 4×4 sub-images 11, as shown in FIG. 12. Here, the "prescribed number" is not particularly limited, although since 2×2 filter processing will later be performed on the image blocks, each side of the square must be an even number of at least 2 pixels. That is, in step S501, the image is divided into a plurality of image blocks, each of which is a partial area of the image. In the present application, the plurality of image blocks obtained at step S501 are referred to as first image blocks. From each of the plurality of first image blocks is acquired a plurality of compartments that correspond to filters for determining the edge direction of the images of the image blocks.

Next, in step S502, the edge extraction unit 203 selects the image blocks one at a time in order. If all of the image blocks have been processed, the edge extraction process is ended from step S503. If an unprocessed image block is selected, the processing proceeds to step S504 from step S503.

In step S504, the edge extraction unit 203 determines the edge direction of the image of the first image block based on the plurality of acquired compartments and the filters (first determination process). That is, the four directional and the non-directional filters shown in FIGS. 13A to 13E are applied to the target image block, and the respective edge strengths ($m\_v$, $m\_h$, $m\_d45$, $m\_d135$, $m\_nd$) are determined. If the maximum edge strength of the determined edge strengths is greater than or equal to the threshold A, the edge extraction unit 203 decides that the direction corresponding to that edge strength is the direction of the target image block 12, and temporarily saves the direction and the edge strength in the RAM 103. On the other hand, if the maximum edge strength is below the threshold A, the edge direction remains undecided. At this time, the edge extraction unit 203 temporarily saves the average luminance of the image block 12 in the RAM 103. Since the average luminances ($a(0)$ to $a(3)$) of the four small areas into which each image block is divided are determined when determining the edge strengths, as shown in equation (1), the average luminance of the image block 12 can be determined with little processing cost.

If it was possible to decide the edge direction in step S504, the processing returns to step S502 from step S505. On the other hand, if it was not possible to decide the edge direction in step S504, the processing proceeds to step S506 from step S505.

In step S506, the edge extraction unit 203 determines whether edge extraction failure has occurred in relation to the target image block 12. The extraction failure determination will be described below with reference to FIG. 6. If it is determined in step S506 that extraction failure has occurred, the processing proceeds to step S507. In step S507, the edge extraction unit 203 again decides the edge direction of the target image block 12 using a correction process (direction decision correction process). Note that the edge direction determination performed in step S507 is also called the second determination process in contrast to the first determination process (S504). The determination process in step S506 is to determine the possibility of an edge existing in the image block, based on the luminance distribution and the like of the first image block, in the case where the edge direction cannot be determined with the first determination process, and is also called the third determination process. The edge extraction process then returns to step S502. This correction process will be described in detail below with reference to FIG. 8. Note that if it is determined in step S506 that edge extraction failure has not occurred, the processing returns directly to step S502.

Figure 6:
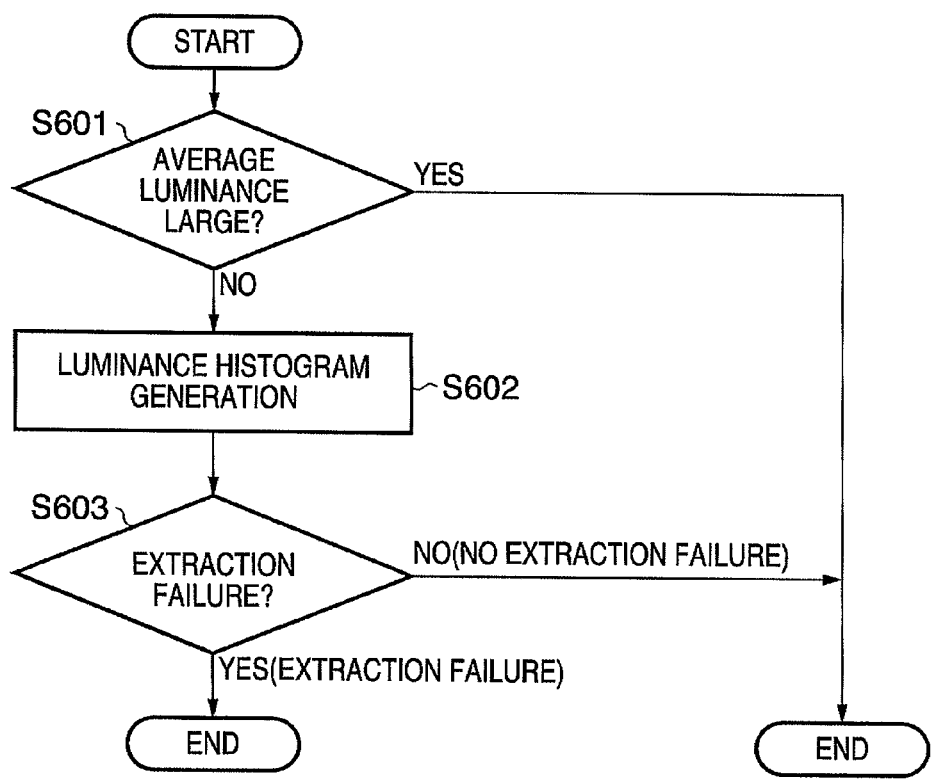
FIG. 6 is a flowchart showing a process of determining edge extraction failure according to the preferred embodiment.

Next, the process of determining edge extraction failure in step S506 will be described in detail using the flowchart of FIG. 6.

In step S601, the edge extraction unit 203 determines whether the average luminance of the target image block 12 is greater than a prescribed value. The problem that the present invention attempts to solve occurs mainly with lines and often with lines on a white background. Also, with lines it is highly likely that many of the image blocks will not have a line segment. Therefore, in the present embodiment, if the average luminance of the target image block is greater than a prescribed value, the image block is judged either to have no line segments or to have few edges. That is, if the average luminance is greater than a prescribed value, the processing is ended, having assumed that there is no edge extraction failure. This enables unnecessary correction of image blocks with few line segments to be prevented and the processing speed of the edge extraction to be increased. On the other hand, if the average luminance of the target image block 12 is determined in step S601 to be less than or equal to the prescribed value, the processing proceeds to step S602.

In step S602, the edge extraction unit 203 generates a luminance histogram for the target image block 12, in order to determine whether a line segment exists in the target image block 12. The average luminance of the target image block 12 determined at step S504 is used in generating the luminance histogram. Histogram generation will now be described in detail.

Figure 7A:
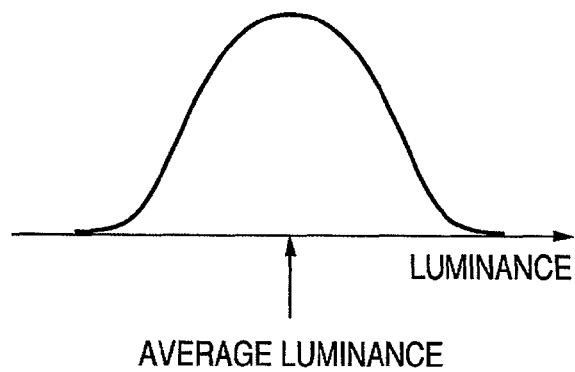
FIGS. 7A to 7C show exemplary luminance histograms for image blocks according to the preferred embodiment.
Figure 7B:
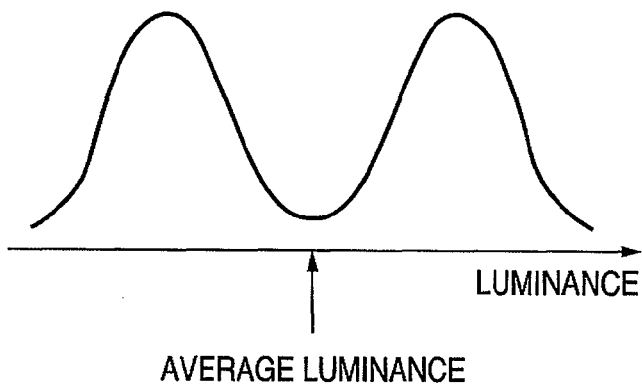
Figure 7C:
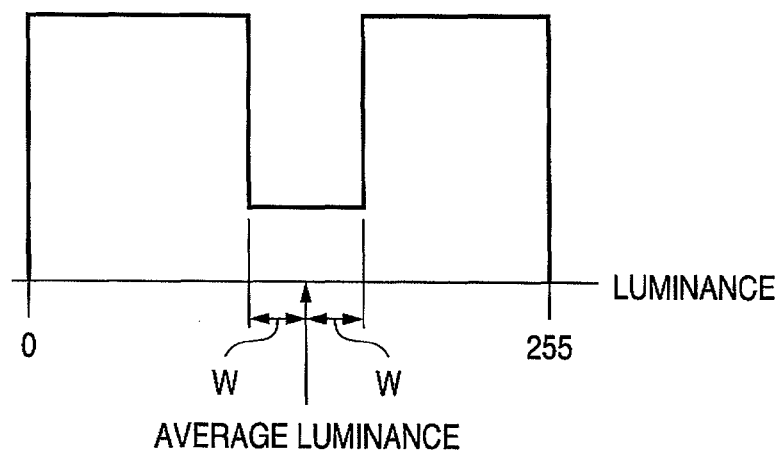
Figure 14A:
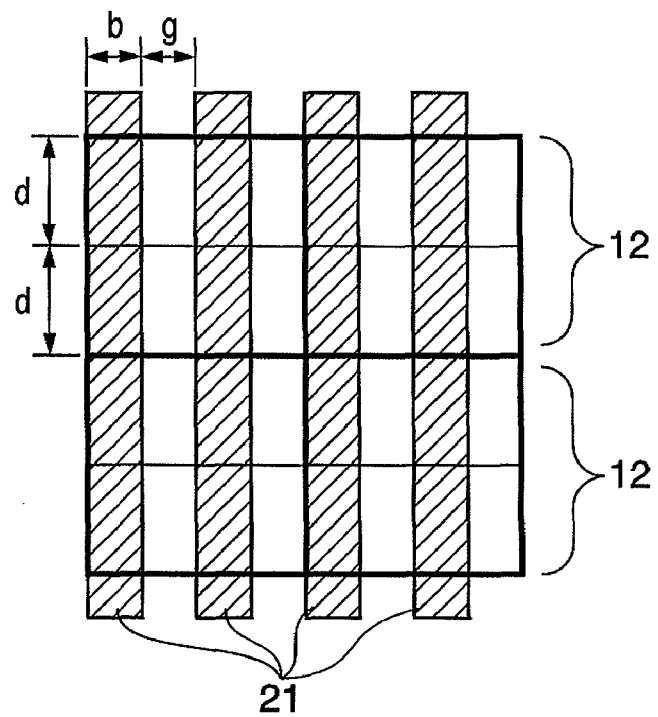
FIGS. 14A to 14B illustrate problems with a conventional edge extraction method.
Figure 14B:
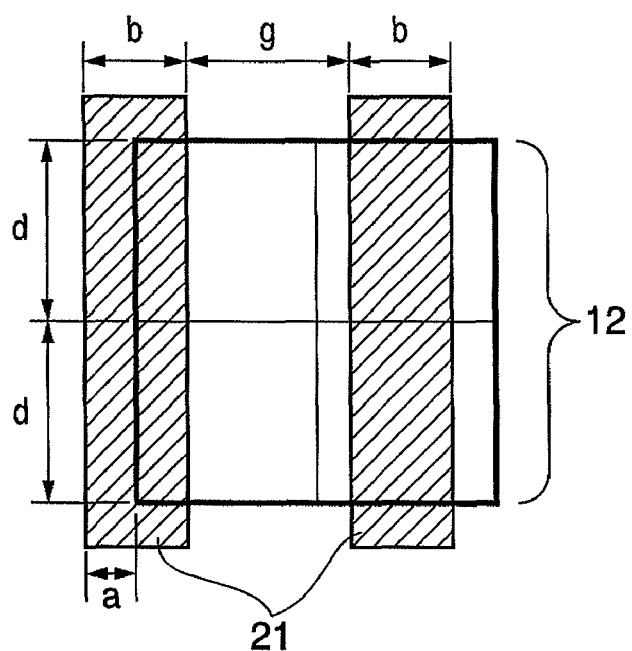

The luminance histogram of an image block 12 is thought to exhibit a uniform distribution such as shown in FIG. 7A if a line segment does not exist. However, if a line segment does exist in an image block 12 such as shown in FIGS. 14A and 14B, the frequency of very large values of either side of the average luminance will be greater than the frequency of the average luminance, as shown in FIG. 7B. Either one of the peaks may also be higher than the other depending on the thickness of the line. Consequently, in the present embodiment, the edge extraction unit 203 generates a luminance histogram with three bins, and with a value obtained by subtracting a prescribed value W from the average luminance and a value obtained by adding the prescribed value W to the average luminance as the boundaries of the bins, as shown in FIG. 7C. This luminance histogram enables the difference between FIGS. 7A and 7B to be easily determined.

In step S603, the edge extraction unit 203 determines whether edge extraction failure has occurred using the luminance histogram generated at step 5602. In the present embodiment, the edge extraction unit 203 judges that extraction failure has occurred if the frequency value of the bin corresponding to the average luminance is less than the values of the other two bins by a prescribed value Z or more, and that extraction failure has not occurred if this is not the case. Thus, by performing the correction process of step S507 after determining whether extraction failure has occurred, executing the correction process on image blocks in which extraction failure has not occurred can be prevented. Since the correction process of step S507 attempts to determine the edge direction repeatedly while changing the size of the image block, as will be described below, the omission of unnecessary correction contributes markedly to improving the processing speed.

Figure 8:
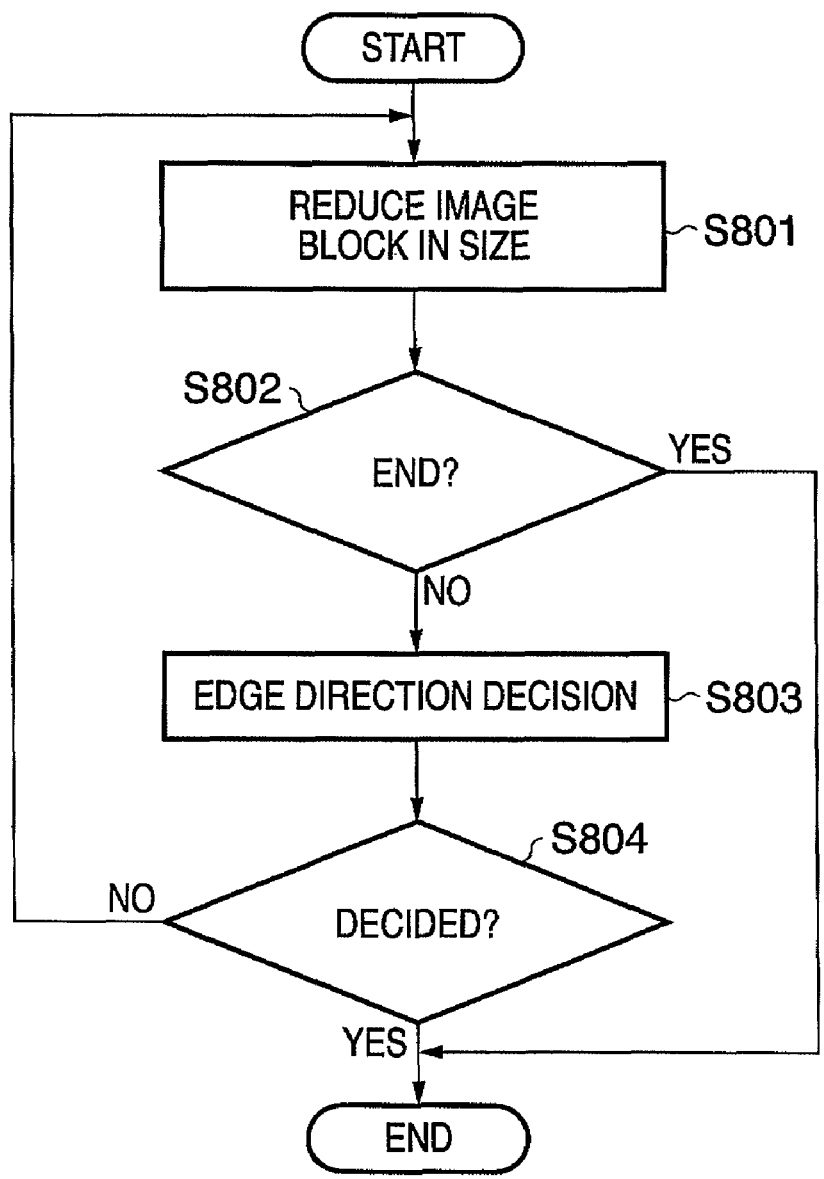
FIG. 8 is a flowchart showing an edge direction correction process according to the preferred embodiment.

Next, the correction process of step S507 will be described in detail using the flowchart of FIG. 8. The correction process involves generating a second image block constituted by a plurality of compartments that differ in size to the plurality of compartments acquired in relation to the first image blocks, and determining the edge direction of the image in the second image block based on this plurality of compartments and the filters.

Figure 15A:
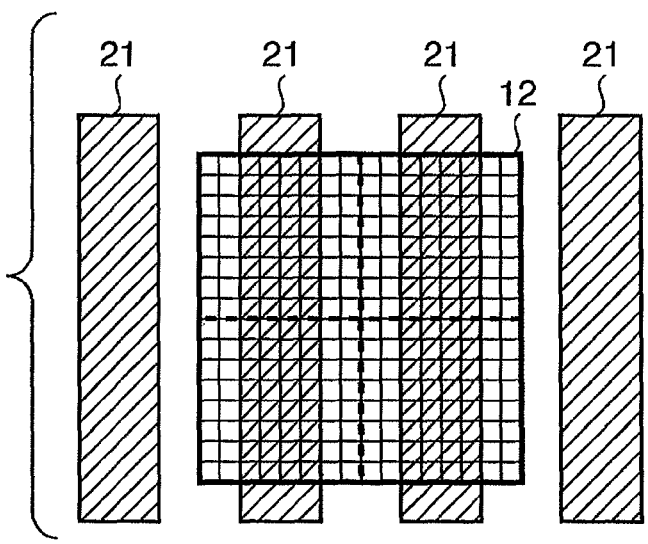
FIGS. 15A to 15C illustrate the reduction of an image block.
Figure 15B:
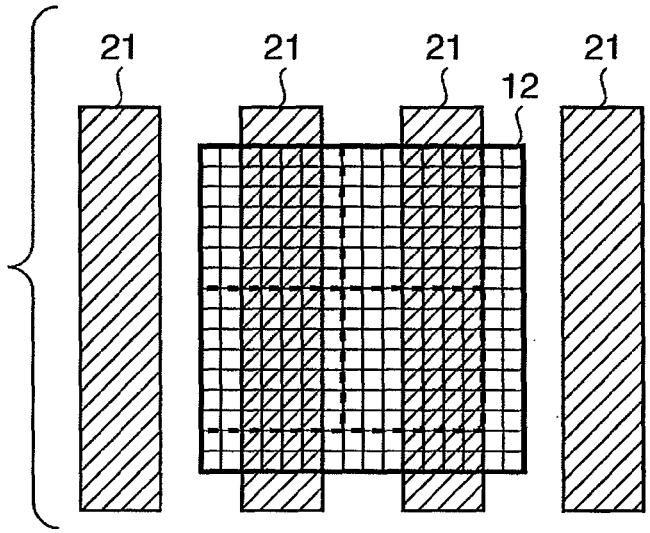
Figure 15C:
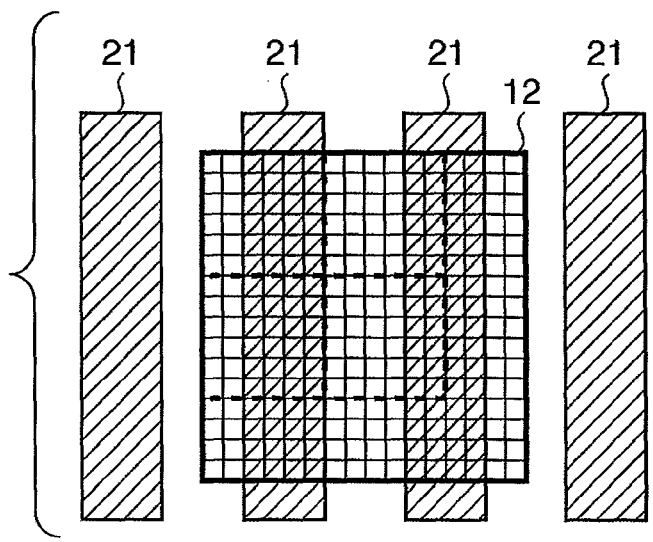

In step S801, the edge extraction unit 203 reduces the height and width of the target image block 12 by two pixels each. A plurality of compartments that differ in size to the plurality of compartments acquired at step S501 are thus acquired. As is clearly seen from FIGS. 15A to 15C, gradually making the image block smaller in size will enable an edge to be extracted sooner or later, even in the case where an edge could not be detected in relation to hatching. For example, if the lines 21 and the image block 12 are disposed as shown in FIG. 15A, an edge will not be detected because a difference in average luminance between the vertical or lateral compartments does not occur. As shown in FIG. 15B, a difference in average luminance between the vertical or lateral compartments still does not arise when the original image block 12 is reduced vertically and horizontally by two pixels. In contrast, if the size of the original image block 12 is reduced vertically and horizontally by four pixels each as shown in FIG. 15C, a difference in average luminance between the lateral compartments does arise, allowing a vertical edge to be detected.

Next, in step S802, the edge extraction unit 203 branches depending on the size of the image block. The edge extraction unit 203 branches depending on whether the size of the processed image block is less than a prescribed proportion of the initial image block size. For example, if the image block is less than half the original size, it is assumed that an edge could not be extracted, and the processing is ended after temporarily saving the fact that there is no edge in the RAM 103. If the image block is greater than or equal to half the original size, the processing proceeds to step S803.

In step S803, the edge extraction unit 203 decides the edge direction (second determination process). This processing is the same as step S504. In step S804, the edge extraction unit 203 determines whether the edge direction could be decided in step S803. If the edge direction could not be decided, the processing returns to step S801, whereas if the edge direction could be decided, the processing is ended. This enables an edge direction that could not be decided at step S504 in relation to hatching or the like to be decided and corrected, by deciding the edge direction while gradually reducing the size of the image block.

Note that although the direction decision process of step S507 is performed only if it is determined at the third determination process of step S506 that there is extraction failure, the present invention is not limited to this configuration. For example, it is possible to omit the determination of step S506, and to always perform the direction decision process of step S507. In this case, for example, the edge direction determination result giving the strongest edge strength is employed from the plural types of edge direction determination results obtained by changing the size of the image block. Thus, according to the present embodiment, the edge directions of partial areas included in an image are decided based on the edge directions determined by at least one of the first determination process and the second determination process.

Figure 9:
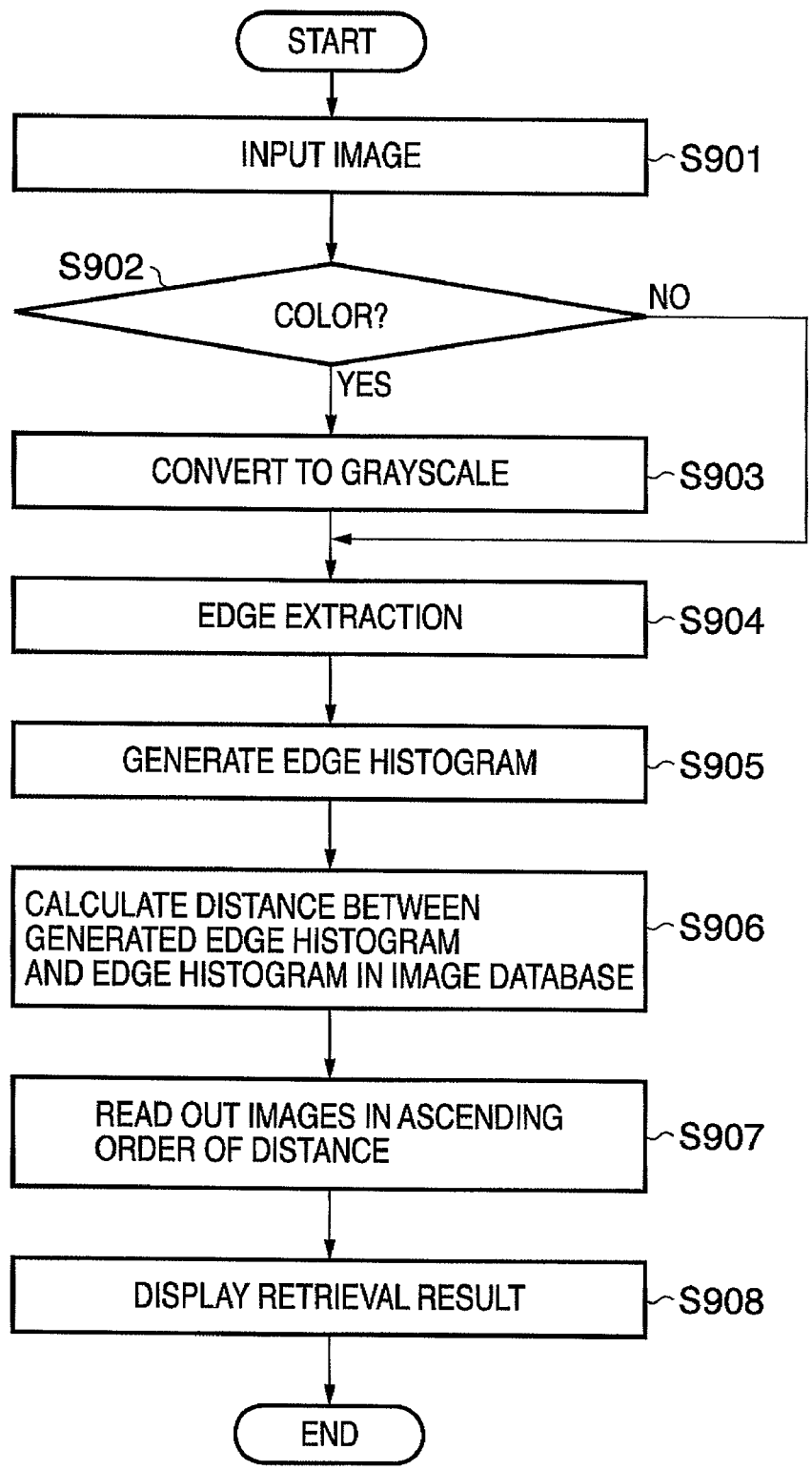
FIG. 9 is a flowchart showing a retrieval process according to the preferred embodiment.

Retrieval Process The retrieval process by the image processing apparatus 100 will be described using the flowchart of FIG. 9.

Firstly, in steps S901 to S905, a query image is input by the image input unit 201, and an edge histogram is generated by the preprocessing unit 202, the edge extraction unit 203 and the edge histogram generation unit 204. The processing up till this point is the same as steps S301 to S305 of the registration process in FIG. 3.

Next, in step S906, the distance calculation unit 206 reads out the edge histogram of each image in the image database 205 in order, and calculates the distance between the read edge histogram and the edge histogram of the input query image. Specifically, the distance calculation unit 206 sums the absolute values of the differences between the bins of the edge histograms Eij, for example. The smaller the calculated distance the more both images resemble one another, with the image resulting in the smallest distance being the first candidate. A list of the distances thus calculated and the IDs of images to search is temporarily saved in the RAM 103.

Next, in step S907, the distance calculation unit 206 reads out the images in order from the image database 205 with reference to an index based on the image IDs, after firstly sorting the list acquired at step S906 in ascending order of the distance, and reduces the read images to generate thumbnail images.

Next, in step S908, the display unit 207 displays the retrieval result. More specifically, the display unit 207 displays the thumbnail images acquired at step S907 in a matrix together with the distances. For example, the display unit 207 displays rows of the thumbnail images in order from left to right and from top to bottom starting with the first candidate. The user is able to check whether the desired image was obtained as a result.

Additional Embodiments

In the foregoing embodiment, an edge histogram disclosed in document 1 was used as a feature amount in image retrieval, although the present invention is of course not limited to this configuration. For example, it is possible to omit the nondirectional filter, and use only directional filters. Also, equation (1) does not take into consideration differences in edge orientation (uses absolute values), although differences in orientation may be taken into consideration by handling the plus and minus values separately in equation (1). Also, five or more directional filters may be used. For example, eight directional filters may be used, adding 22.5 degree, 67.5 degree, 112.5 degree and 157.5 degree filters to the four directional filters shown in FIGS. 13A to 13D.

Figure 10:
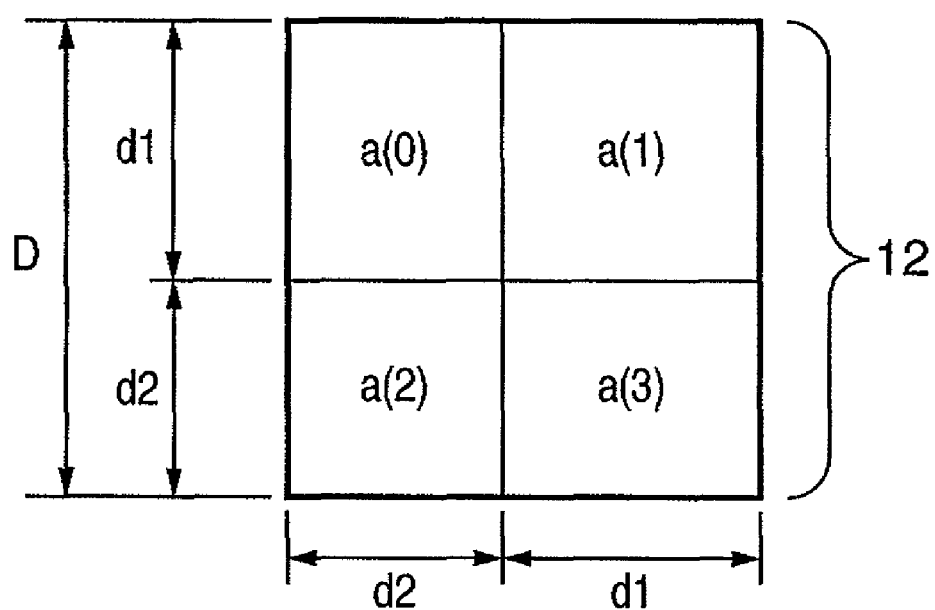
FIG. 10 shows an example of changing the size of compartments in an image block.

In the foregoing embodiment, the edge direction decision was corrected when edge extraction failure occurs by reducing the size of the image block, as shown in step S801, although the present invention is not limited to this configuration. For example, correction may be performed by enlarging the image block, which also enables an edge to be extracted in relation to hatching or the like. Also, the size of the compartments in an image block may be changed, as shown in FIG. 10, without changing the size of the image block. That is, the shape of the compartments in the image block 12 is changed by changing the division ratio, such as decreasing the value of d2 and increasing the value of d1, as shown in FIG. 10. This enables an edge associated with hatching or the like to be extracted, by performing edge direction detection using the foregoing filters after thus changing the shape of the compartments. That is, according to the foregoing embodiment, line segment detection failure is prevented as a result of acquiring a plurality of compartments by changing the pixel configuration of the plurality of compartments acquired from an image block, and then performing edge direction detection using the filters for the new plural compartments.

In the foregoing embodiment, the edge direction decision was corrected for image blocks determined to have edge extraction failure, although a plurality of histograms may be generated with plural types of image blocks, and an edge histogram with large frequencies may be employed. For example, after generating an edge histogram at the initial image block size, the size of an image block is gradually reduced while regenerating the edge histogram step-by-step. An edge histogram with large frequencies in each direction relative to a sub-image is employed from the plurality of edge histograms thus obtained. Note that in the case where the frequencies of the edge histograms relative to image blocks of different size (i.e., different numbers of image blocks in a sub-image) are compared, the frequencies obviously need to be normalized with the number of image blocks.

Figure 11:
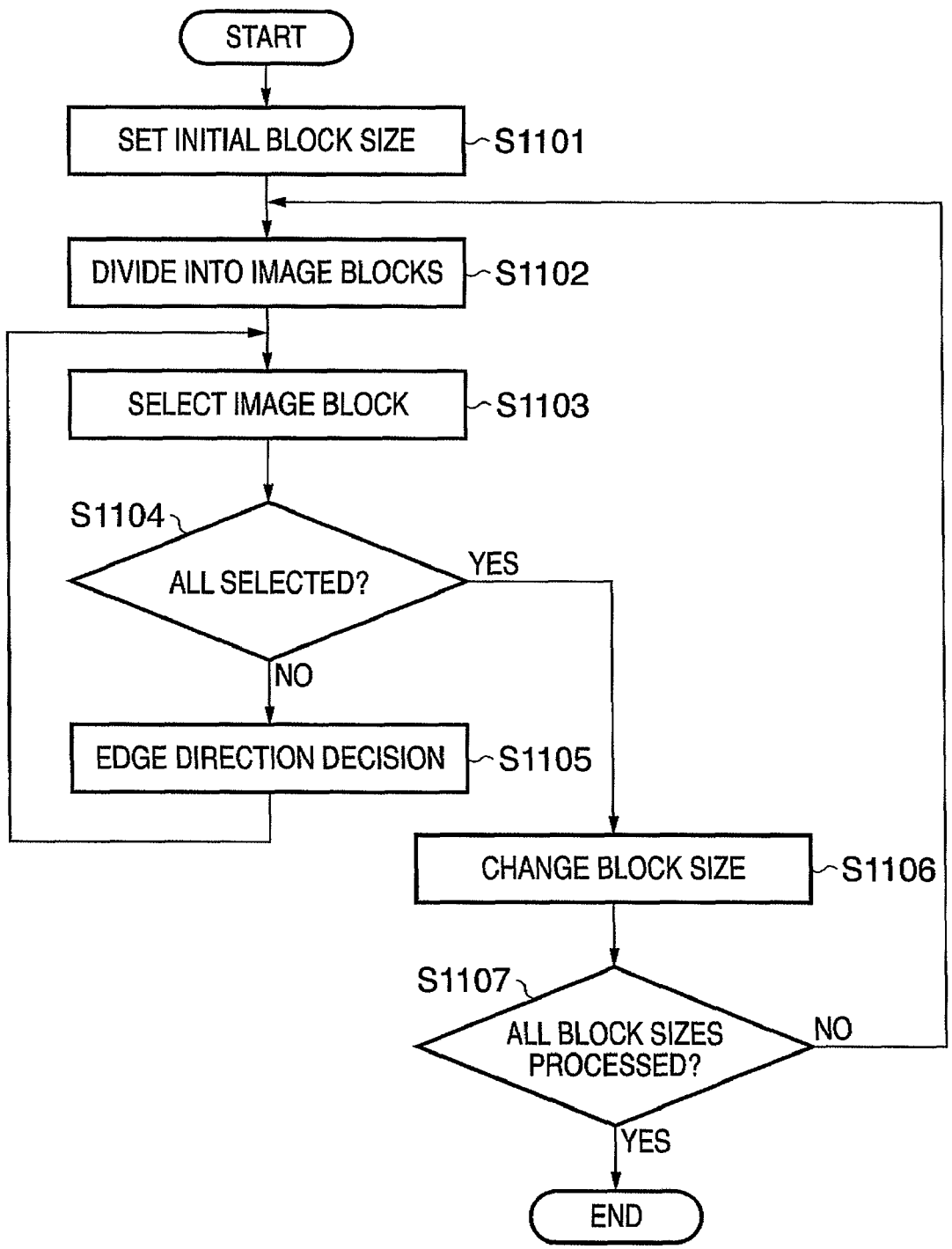
FIG. 11 is a flowchart showing a variation of the edge extraction process according to the preferred embodiment.

FIG. 11 is a flowchart illustrating a process for when generating the plurality of edge histograms. The edge extraction unit 203 sets the initial size of the image blocks in step S1101. In step S1102, the edge extraction unit 203 divides the input image into image blocks of the set block size. Steps S1102 to S1105 are similar to steps S501 to S504 of FIG. 5. If it is determined at step S1104 that all of the image blocks have been processed, the processing proceeds to step S1106. In step S1106, the edge extraction unit 203 changes the block size of the image blocks. For example, the edge extraction unit 203 sets an image block size reduced vertically and horizontally by two pixels each. If all the block sizes prepared in advance have been processed, the processing is ended from step S1107. If there is an unprocessed block size, the processing returns to step S1102, and the edge direction is decided after dividing the image block whose block size has been changed. At step S305, an edge histogram with a high frequency (e.g., edge histogram having the greatest maximum frequency value) is selected from the edge extraction results corresponding to the plurality of image block sizes, and employed as the edge histogram of the input image.

In the foregoing embodiment, it is determined that edge extraction failure has not occurred if the image block has a large average luminance, as shown in step S601, although it may also be determined that edge extraction failure has not occurred if the image block has an average luminance smaller than a prescribed threshold. Also, in the foregoing embodiment, edge extraction failure is determined using a luminance histogram based on the average luminance of an image block, as shown in step S602, although the present invention is not limited to this configuration. For example, the luminance dispersion within an image block may be determined, and it may be determined that edge extraction failure has occurred if the dispersion is greater than a prescribed value. That is, the possibility of existence of an edge is determined based on the luminance distribution within an image block (luminance histogram or luminance dispersion).

As described above, according to the foregoing embodiment, processing speed is fast compared to a method using the Sobel filter or the like, and edge extraction that avoids edge extraction failure is possible in relation to hatching or the like, enabling high accuracy image retrieval utilizing edge features to be achieved.

While the embodiments have been described in detail above, the present invention can take an embodiment as a system, an apparatus, a method, a program or a storage medium, for example. Specifically, the present invention may be applied to a system constituted by a plurality of devices or to an apparatus composed of a single device.

Note that the present invention includes the case where the functions of the foregoing embodiments are attained by supplying a software program directly or remotely to a system or an apparatus, and reading and executing the supplied program code with a computer of the system or apparatus. In this case, the supplied program corresponds to the flowcharts shown in the drawings in the embodiments.

Consequently, the present invention is also realized by the actual program code installed on the computer, in order to realize the functional processing of the present invention by computer. In other words, the present invention also includes the actual computer program for realizing the functional processing of the present invention.

In this case, the program may take any form, such as object code, a program executed by an interpreter, or script data supplied to an operating system as long as the program as the program function.

Examples of computer-readable storage media for supplying the program include floppy (register trademark) disk, hard disk, optical disk, magneto-optical disk, MO, CD-ROM, CD-R, CD-RW, magnetic tape, nonvolatile memory card, ROM, and DVD (DVD-ROM, DVD-R).

Alternatively, the program can also be supplied by connecting to a website on the Internet using the browser of a client computer, and downloading the computer program of the present invention from the website to a recording medium such as a hard disk. In this case, the downloaded program may be a compressed file including an auto-install function. The functions of the foregoing embodiments can also be realized by dividing program code constituting the program of the present invention into a plurality of files, and downloading the respective files from different websites. In other words, a World Wide Web (WWW) server that allows a plurality of users to download program files for realizing the functional processing of the present invention by computer is also included in the present invention.

The program of the present invention may also be distributed to users in encrypted form stored on a storage medium such as a CD-ROM. In this case, users that meet a prescribed requirement are allowed to download decryption key information from a website via the Internet, and install the program decrypted using this key information on a computer by executing the decrypted program.

Apart from being realized by a computer executing the read-out program, the functions of the foregoing embodiments may, for example, be realized in cooperation with an operating system or the like running on a computer, based on instructions in the program. In this case, the operation system or the like performs part or all of the actual processing, with the functions of the foregoing embodiments being realized by this processing.

Further, the program read out from the storage medium may also be written to a memory provided in a function expansion board inserted in a computer or a function expansion unit connected to a computer, to realize part or all of the functions of the foregoing embodiments. In this case, a CPU or the like provided in the function expansion board or the function expansion unit then performs part or all of the actual processing based on instructions in the program, after the program has been written to the function expansion board or the function expansion unit.

The present invention enables the edge feature amount of images to be calculated more accurately. Also, the processing speed of the edge direction determination is high compared to a method using the Sobel filter or the like, since edge direction is determined in image blocks according to the present invention. That is, according to the present invention, an image processing apparatus and method can be provided that are capable of obtaining, at high speed, sufficient edge features for use in image retrieval or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-105250, filed on Apr. 12, 2007, which is hereby incorporated by reference herein in its entirety.

What is claimed is:

1. An image processing apparatus comprising:
a dividing unit constructed to divide an image into a plurality of first image blocks, each of which is a partial area of the image;
an acquiring unit constructed to divide each first image block obtained by the dividing means, and to acquire a plurality of compartments that correspond to filters for determining an edge direction of an image of the first image block;
a first determining unit constructed to determine the edge direction of each first image block, based on the plurality of compartments acquired by the acquiring unit and the filters;
a deciding unit constructed to decide that a first image block whose edge direction cannot be determined by the first determining unit is a failed image block;
a generating unit constructed to generate, from the failed image block, a second image block constituted by a plurality of compartments that differ in size from the plurality of compartments acquired by the acquiring unit;
a second determining unit constructed to determine the edge direction of the second image block, based on the plurality of compartments generated by the generating unit and the filters;
a non-transitory computer-readable memory constructed to store computer-executable process steps; and
a processor constructed to function as at least one of the units by executing the computer-executable process steps stored in the memory.

2. The image processing apparatus according to claim 1, wherein the generating unit generates a second image block equal in size to the first image blocks.

3. The image processing apparatus according to claim 1, wherein the generating unit generates a second image block that differs in size to the first image blocks.

4. The image processing apparatus according to claim 2, further comprising a third determining unit configured to determine a possibility of existence of an edge in the failed image block, wherein
the third determining unit prohibits processing by the generating unit and the second determining unit if it is determined that there is no possibility of existence of an edge in the failed image block.

5. The image processing apparatus according claim 1, wherein
the dividing unit divides the image into a plurality of sub-images, and further divides each sub-image into the plurality of first image blocks, and
the image processing apparatus further comprises a registering unit constructed to generate, for each sub-image, a histogram of the edge direction determined by the first determining unit or the second determining unit, and to register the generated histogram as a feature amount of the image.

6. An image processing method comprising:
using a processor to perform:
a dividing step of dividing an image into a plurality of first image blocks, each of which is a partial area of the image;
an acquiring step of dividing each first image block obtained in the dividing step, and of acquiring a plurality of compartments that correspond to filters for determining an edge direction of an image of the first image block;
a first determining step of determining the edge direction of each first image block, based on the plurality of compartments acquired in the acquiring step and the filters;
a deciding step of deciding that a first image block whose edge direction cannot be determined in the first determining step is a failed image block;
a generating step of generating, from the failed image block, a second image block constituted by a plurality of compartments that differ in size from the plurality of compartments acquired in the acquiring step; and
a second determining step of determining the edge direction of the second image block, based on the plurality of compartments generated in the generating step and the filters.

7. The image processing method according to claim 6, wherein in the generating step, a second image block equal in size to the first image blocks is generated.

8. The image processing method according to claim 6, wherein in the generating step, a second image block that differs in size to the first image blocks is generated.

9. The image processing method according to claim 7, further comprising a third determining step of determining a possibility of existence of an edge in the failed image block, wherein
in the third determining step, processing in the generating step and the second determining step is prohibited if it is determined that there is no possibility of existence of an edge in the failed image block.

10. The image processing method according to claim 6, wherein
in the dividing step, the image is divided into a plurality of sub-images, and each sub-image is further divided into the plurality of first image blocks, and
wherein the image processing method further comprises a registering step of generating, for each sub-image, a histogram of the edge direction determined in the first determining step or the second determining step, and registering the generated histogram as a feature amount of the image.

11. A non-transitory computer-readable storage medium retrievably storing a computer program that causes a computer to execute:
a dividing step of dividing an image into a plurality of first image blocks, each of which is a partial area of the image;
an acquiring step of dividing each first image block obtained in the dividing step, and acquiring a plurality of compartments that correspond to filters for determining an edge direction of an image of the first image block;
a first determining step of determining the edge direction of each first image block, based on the plurality of compartments acquired in the acquiring step and the filters;
a deciding step of deciding that a first image block whose edge direction cannot be determined in the first determining step is a failed image block;
a generating step of generating, from the failed image block, a second image block constituted by a plurality of compartments that differ in size from the plurality of compartments acquired in the acquiring step; and
a second determining step of determining the edge direction of the second image block, based on the plurality of compartments generated in the generating step and the filters.

* * * * *